United States Patent [19]

Marier et al.

[11] Patent Number: 4,878,339
[45] Date of Patent: Nov. 7, 1989

[54] POWER LAWN MOWER WITH SELECTIVELY DEPLOYABLE RIDING PLATFORM

[75] Inventors: Gregory J. Marier, Brooklyn Park, Minn.; Tommy O. Moats, Frederic, Wis.

[73] Assignee: Yamaha Hatsudoki Kabushiki Kaisha, Iwata, Japan

[21] Appl. No.: 268,344

[22] Filed: Nov. 7, 1988

[51] Int. Cl.⁴ .................... A01D 67/04; B62D 51/02; B62D 51/04
[52] U.S. Cl. ........................................ 56/14.7; 56/323; 180/19.1; 180/209; 180/326
[58] Field of Search ................... 56/2, 14.7, 14.9, 11.3, 56/15.9, 11.7, 228, 11.8, 323, 10.1; 180/209, 19.1, 326, 19.3; 280/149.2

[56] References Cited

U.S. PATENT DOCUMENTS

| | | | |
|---|---|---|---|
| 2,731,096 | 1/1956 | Thelander | 56/14.7 |
| 2,871,585 | 2/1959 | Merry et al. | 180/19.1 |
| 2,880,034 | 3/1959 | Kamlukin | 180/19.1 |
| 2,919,756 | 1/1960 | Knipe | 180/11 |
| 3,190,672 | 6/1965 | Swanson et al. | 180/11 |
| 3,485,314 | 12/1969 | Herr | 180/19.1 |
| 3,891,043 | 6/1975 | Valdex | 180/19.1 |
| 4,514,967 | 5/1985 | Scanland et al. | 56/14.7 |
| 4,558,558 | 12/1985 | Horner, Jr. et al. | 180/19.3 |

FOREIGN PATENT DOCUMENTS 2041853  9/1980  United Kingdom .................... 56/2

Primary Examiner—Bruce M. Kisliuk
Attorney, Agent, or Firm—Haugen and Nikolai

[57] ABSTRACT

A motor-powered lawn mower is described which includes provisions for converting same from a walk-behind mower to a stand-up riding mower. A driven shaft associated with the rear wheels is journaled for rotation at the lower ends of a pair of pivot arms which are hinged to opposed sides of the mower's frame. Also coupled to the pivot arms is a riding platform. When the rear wheel assembly is swung forward relative to the frame, the riding platform is tucked beneath the frame so as not to obstruct the feet of the operator walking behind the mower and guiding its path of travel. By swinging the rear wheel assembly to extend rearward of the frame, the riding platform becomes deployed in a horizontal position so that the operator may stand upon it as he manipulates the controls to steer the vehicle.

8 Claims, 2 Drawing Sheets

POWER LAWN MOWER WITH SELECTIVELY DEPLOYABLE RIDING PLATFORM

BACKGROUND OF THE INVENTION

I. Field of the Invention:

This invention relates generally to power lawn mower apparatus and more particularly to a lawn mower which can be operated by a person walking behind it or, alternatively, riding in a standing position on a platform carried by the mower.

II. Discussion of the Prior Art:

Generally speaking, self-propelled power lawn mowers of the walk-behind type, because of a compact wheel-base, tend to be more maneuverable than conventional riding lawn mowers where the operator positions himself on a seat and guides the mower using a steering wheel or tiller. The compact wheel-base provides the mower with a tight turn radius. Thus, when cutting around building foundations, trees, and other natural obstructions, it is easier to steer and direct the walk-behind mower so as to cut close up to these obstacles. However, when cutting more open areas, a riding mower offers the benefit of being able to travel at a higher speed so that a larger area can be covered in lesser time than is possible with a walk-behind mower.

A walk-behind mower also offers the advantage of being somewhat smaller than conventional riding mowers and, thus, take up less storage space in a garage. Because of their smaller size, they also tend to be lighter in weight and are thus more readily capable of being transported in a trailer to a worksite by commercial lawncare services.

Considering the above pros and cons of prior art walk-behind and riding lawn mowing apparatus, a real advantage lies in combining the advantages of these two types in a single unit. If the maneuverability of a walk-behind mower can be maintained while the speed of a riding mower can also be achieved when traversing larger, unobstructed terrain, a real advance in the lawn mowing arts results.

SUMMARY OF THE INVENTION

The foregoing advance is achieved by providing a lawn mower with an elongated narrow frame having caster wheels supporting the front end thereof and a set of rear wheels journaled for rotation on a pair of arms pivotally secured to the frame on opposed side edges thereof near its rear end. Suspended from the frame between the front and rear wheels is a mowing blade assembly. The frame also supports an internal combustion engine whose output shaft is coupled by a suitable transmission linkage to the mower assembly and to a driven shaft on which the rear wheels are affixed. A riding platform is also pivotally coupled to the arms on which the rear wheels are suspended. When the mower is configured for walk-behind operation, the wheels are pivoted forward, providing a relatively short wheel base and increased maneuverability. The drive axle lies beneath the frame and the riding platform is tucked up and out of the way when the walk-behind configuration is being used.

When configured for stand-behind riding, the rear wheels and drive axle therefore are pivoted to a position rearward of the frame so as to provide an extended wheel base. At the same time, the stand-on riding platform becomes deployed horizontally behind the rear wheel assembly and provides a surface on which a standing operator may ride. Because the rear wheels are moved to a location which places the center of mass between the front and rear wheels, the weight of the operator standing on the deployed riding platform does not result in a pivoting of the frame about the rear wheels as a fulcrum and the front wheels lifting free of the ground. Thus, being able to reposition the rear wheel assembly relative to the center of mass of the mower assembly, it can be rendered more maneuverable when in its walk-behind configuration and more stable and able to move at a greater speed when configured in the ride-behind mode.

OBJECTS

It is accordingly a principal object of the present invention to provide lawn mowing apparatus convertible from a walk-behind style to a riding style.

Another object of the invention is to provide a lawn mower which can be converted from walk-behind to riding with a minimum of effort and time.

Yet another object of the invention is to provide an improved lawn mowing apparatus in which the operator may ride in a standing position on a selectively deployable platform while maintaining control over the speed and direction of travel using conveniently positioned hand controls.

DESCRIPTION OF THE DRAWINGS

The foregoing features, objects and advantages of the invention will become apparent to those skilled in the art from the following detailed description of a preferred embodiment, especially when considered in conjunction with the accompanying drawings in which like numerals in the several views refer to corresponding parts.

DESCRIPTION OF THE PREFERRED EMBODIMENT

Figure 1:
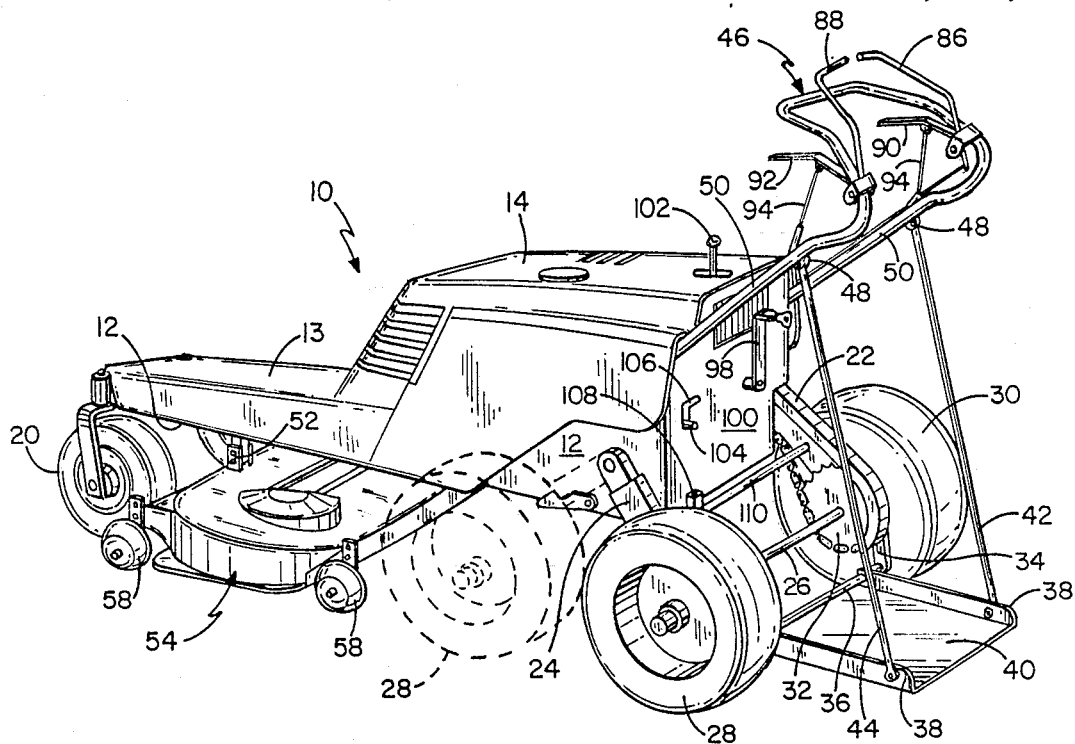
FIG. 1 is a perspective view of the lawn mower of the present invention configured in the ride-behind mode.

Referring to FIG. 1, there is indicated generally by numeral 10 a lawn mowing apparatus constructed in accordance with the present invention. It is seen to include a generally rectangular structural frame member 12 supporting a decorative housing 13 including an engine shroud or cowl 14. The frame member 12 is preferably fabricated from tubular steel having a rectangular cross-section and includes a front transversely extending strut 16 having tubular collars 18 at opposed ends thereof. The tubular collars receive the vertical axles of a pair of caster wheels 20. Pivotally attached to the rear portion of the frame 12 and on opposed sides thereof are pivot arms 22 and 24. The general shape of these arms can be observed in the view of FIG. 3. A shaft 26 is journaled for rotation in bearings supported by the arms 22 and 24 and positioned on opposed ends of the shaft 26 are rear wheels 28 and 30. Also keyed to the shaft 26 is a chain sprocket wheel 32.

Figure 3:
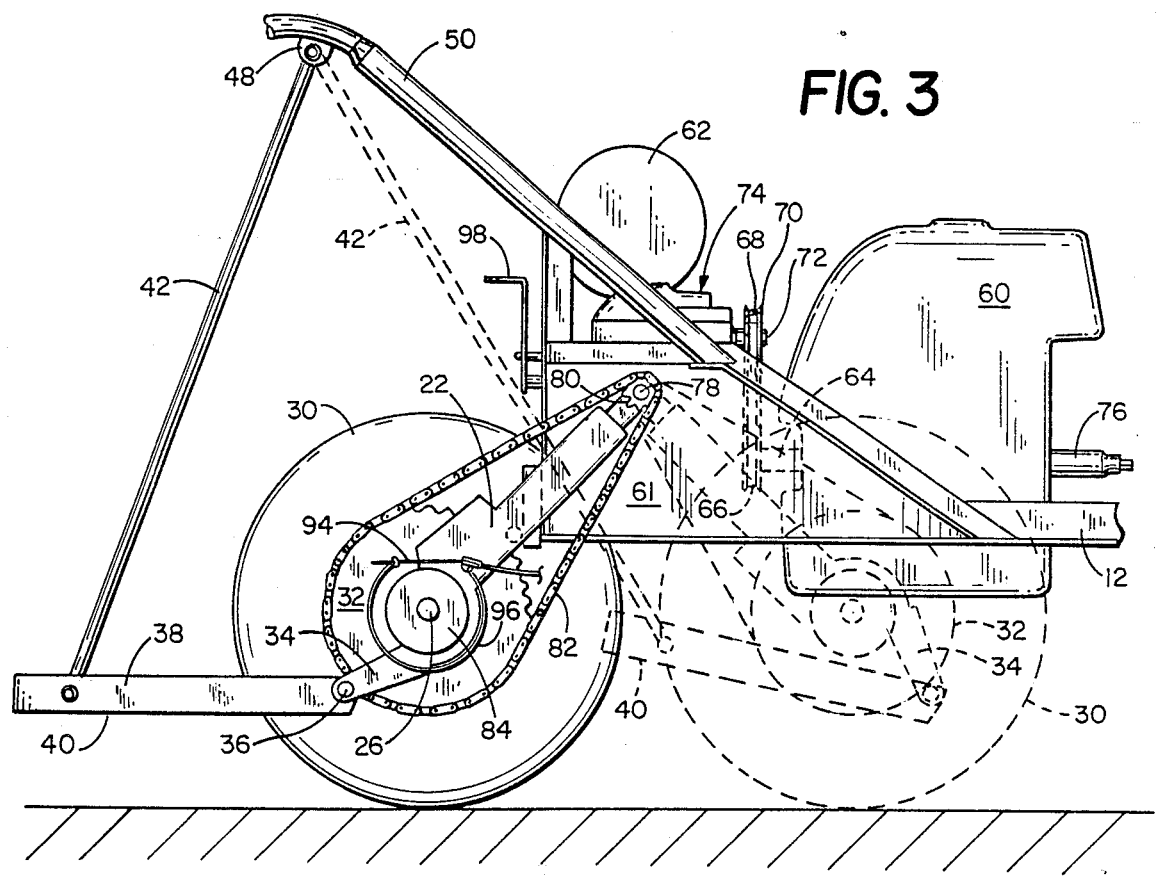
FIG. 3 is a partial side elevation illustrating the manner in which rear wheel assembly may be shifted to accommodate walk-behind and ride-behind modes of operation.

As seen in FIG. 1 and 3, each of the arms 22 and 24 has an integrally formed finger 34 and extending between these fingers is a platform support rod 36. This rod passes through apertures formed through the upwardly turned side edges 38 of a riding platform 40. A pair of platform hanger rods 42 and 44 are pivotally joined to the opposed side edges 38 near the rear edge of the riding platform 40 and the upper ends of the hanger rods 42 and 44 are affixed to a handlebar assembly indicated generally by numeral 46. More particularly, the rods 42 and 44 are coupled by a clevis connection 48 to the side bars 50 of the handlebar assembly 46. These side bars are, in turn, joined to the frame 12 as is more clearly illustrated in the partial view of FIG. 3.

Suspended beneath the frame 12 by means of four hanger straps, one of which is identified by numeral 52, is a mower blade assembly 54. This blade assembly is somewhat conventional in nature and includes a housing 56 surrounding a pair of rotary cutting blades (not shown) which are journaled for rotation on vertical axes. In that the novelty of the present invention resides in other than in the blade assembly, aspects of the design, it is sufficient here to merely point out that power from an internal combustion engine is coupled through a drive shaft to a gear box (not shown) mounted on the blade housing and that the output shaft of the gear box is belt coupled to a pulley to which the belt associated with the dual rotary blades is also joined.

The blade housing assembly 54 may be raised and lowered relative to the ground by appropriate selection of the point on the hanger straps 52 at which the connection to the frame is made. Furthermore, the blade housing support wheels 58 (four in number) are also vertically adjustable relative to the blade housing 56 and tend to insure that ground contact does not occur under rolling terrain.

The internal combustion engine for powering the cutting blades, the sprocket 32 and the shaft 26 is supported on the upper surface of the frame beneath the cowl 14. It preferably comprises a one cylinder, 4-cycle, 12 hp engine, although limitation to such an engine is not intended. A portion of the engine, indicated generally by numeral 60, is visible in the partial view of FIG. 3 but is partly hidden by a side gusset 61 which is welded to the frame 12. For purposes of reference, the air filter housing for engine 60 is identified by numeral 62 and the output shaft 64 of the engine has a V-belt pulley 66 secured thereto. The belt 68 thereon couples that drive pulley 66 to a driven pulley 70 which is joined to the input shaft 72 of a five speed transmission 74. The transmission output shaft 78 has a small diameter chain sprocket wheel 80 keyed to it. A drive chain 82 then encircles the sprocket 80 as well as the large diameter sprocket wheel 32 secured to the driven shaft 26. The mower drive output shaft from the engine is identified by numeral 76 and that shaft leads to the gear box (not shown) which, as was mentioned earlier, is mounted on the blade housing 54 to drive the rotary blades.

Figure 2:
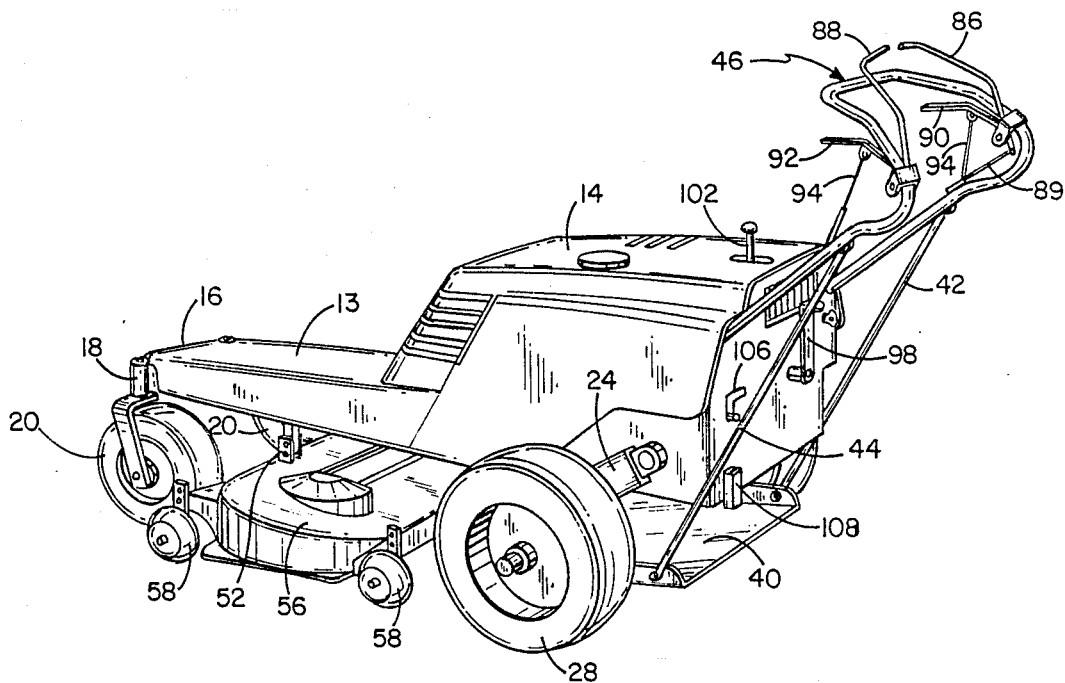
FIG. 2 is a perspective view of the lawn mower of the present invention when configured in the walk-behind mode.

With continued reference to FIG. 3, surrounding the shaft 26 is a disc type clutch mechanism 84. Each of the rear wheels 28 and 30 has such a clutch 84 operatively disposed between it and the driven shaft 26. Hence, when the clutch is engaged, the wheels become locked to and rotate with the shaft 26. When one or both of the wheel clutches is disengaged, the wheel in question is no longer locked to its rotating shaft and will not be driven. As shown in FIGS. 1 and 2, the wheel clutch 84 may conveniently be actuated by the right wheel clutch lever 86. The left wheel clutch lever 88 actuates the left wheel clutch. The clutch levers 86 and 88 may be coupled to the wheel clutch mechanisms 84 by cables as at 89. Also mounted on the handlebar 46 for easy reach by the operator are a right wheel brake lever 90 and a left wheel brake lever 92. Cable 94 couple the lever mechanisms to brake bands associated with each of the wheels, the brake band for the right wheel being identified by numeral 96 in FIG. 3.

Referring again to FIG. 1, the rear wheel assembly is represented in solid line form when the mower is configured to operate in the stand-behind riding mode. Here it can be seen that the platform 40 is deployed rearward of the mower and in a generally horizontal disposition. The platform 40 provides a surface upon which the operator may stand as the mower is driven in either the forward or reverse direction. A shift lever 98 is affixed to a shaft passing horizontally through the rear cover panel 100 into the transmission and provides a means whereby any one of five forward gears, one reverse gear or neutral may be selected. With no limitation intended, the selectable gear ratios of the transmission may be such that the following vehicle speeds may be obtained for the indicated shift lever position:

|  | Forward |
| --- | --- |
| 1 | 1.7 mph |
| 2 | 2.2 mph |
| 3 | 3.7 mph |
| 4 | 4.4 mph |
| 5 | 5.5 mph |
| Reverse | 2.0 mph |

In that a comfortable walking speed is about 3.7 mph, vehicle cutting speed can be increased by using fourth and fifth gears in the ride-on mode.

Also visible in FIGS. 1 and 2 is a throttle lever 102 which passes through a slot formed through the top surface of the shroud 14 for setting the engine speed. A governor is provided on the engine to match the load demand with the engine output. In use, the throttle 102 generally remains set in one position and the speed of travel is determined by the position of the gear shift lever 98.

To steer the mower, the operator may selectively actuate the clutch and brake levers so as to stop one rear wheel while driving the other, causing the vehicle to turn. For straight-ahead travel, both of the clutch levers 86 and 88 are actuated whereby both the wheels 28 and 30 are driven from the shaft 26.

When it is desired to operate the mower in its lower speed, more-maneuverable, walk-behind mode; the wheel assembly may be shifted to its forwardmost position represented by the phantom lines in FIG. 1. This walk-behind position is also shown in solid line representation in FIG. 2. It may also be noted from FIG. 2 that when the wheel assembly is pivoted to the forward position illustrated, the riding platform 40 is carried forward as well, and tucked beneath the frame, out of the way of the operator's feet as he walks.

Figure 4:
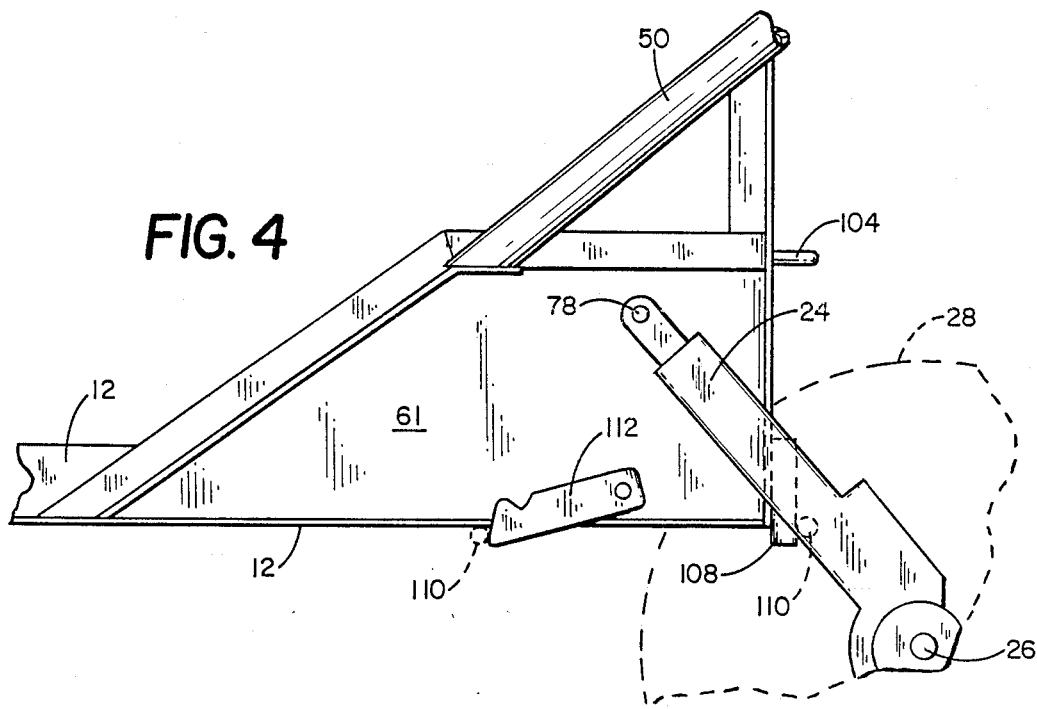
FIG. 4 is a detailed side view illustrating the latching mechanism for retaining the rear wheel assembly in a desired orientation.

A very simple maneuver is required to convert the mower from the operator-riding mode illustrated in FIG. 1 to the walk-behind mode illustrated in FIG. 2. Specifically, the operator will first lift a lever rod 104 and position it in the horizontal portion of the slot 106 formed in the rear panel 100. This raises a stop bar 108 positioned at the rear of the frame. Now, when the shift lever 98 is moved to a forward gear position and the clutch levers 86 and 88 are simultaneously actuated, the wheels 28 and 30 will rotate in their counterclockwise direction (when viewed as in FIG. 1). The spacer rod 110 which extends between the pivot arms 22 and 24 will pass beneath the now-elevated stop bar 108 until spacer rod 110 comes to rest beneath the frame with the pivot arms 22 and 24 along with the wheels 28 and 30 in their forwardmost position. Lever 104 may then be dropped to lower stop latches 108 and 112. With reference to FIG. 4, it will be noted that when the wheel assembly is moved to its forward disposition illustrated in FIG. 2, the stop rod 110 will sweep past a latch bar 112 also linked to the lever 104 and will ultimately come to rest in engagement with the undersurface of the frame 12 and juxtaposed with the nose of the latch bar 112. Now, the wheels 28 and 30 can be driven in their counterclockwise direction (FIG. 2) to move the mower forward. The latch bar 11 will prevent the wheel assembly from moving to its rearward or ride-behind orientation until the lever 104 is again actuated to lift the latch bars 112 and 108. Once these two latch bars are elevated and lever 98 is used to select "reverse" by engaging the wheel clutches through manipulation of the levers 86 and 88, the rear wheels can be made to move independent of the frame and allow deployment of the ride platform 40. Lowering the latch bar 108 precludes inadvertent rotation of the pivot arms 22 and 24 when operating the mower in each mode.

For the purpose of illustrating the principles of the invention, only one arrangement has been disclosed for deploying the riding platform 40. Those skilled in the art will recognize that other ways are available for swinging that platform up and out of the way when it is desired to operate the mower in its walk-behind mode. For example, it is possible to deploy the platform independent of the repositioning of the rear wheels through subsequent operator action.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to equipment details and operating procedures, can be accomplished without departing from the scope of the invention itself.

What is claimed is:

1. Power lawn mowing apparatus comprising in combination:
   (a) frame means having front and rear ends;
   (b) an internal combustion engine supported on said frame and having an output shaft;
   (c) wheel means supporting said frame means at said front end;
   (d) first and second arm members pivotally secured to said frame means along opposed side edges thereof;
   (e) further wheel means suspended from said first and second arm members for allowing the axis of rotation of said further wheel means to be moved forward and rearward relative to said rear end of said frame;
   (f) cutting means suspended from said frame at a location between said front and rear ends of said frame;
   (g) means for selectively coupling said engine output shaft in driving relation to said cutting means;
   (h) means for selectively coupling said engine output shaft in driving relation to said further wheel means; and
   (i) riding platform means suspended from said frame proximate said rear end and movable between a first location which is non-interfering with the feet of an operator walking behind said rear end of said frame and a second location extending rearward and generally horizontally from said rear end of said frame allowing the operator to stand thereon.

2. The power lawn mower as in claim 1 wherein said riding platform means is operatively coupled to said arm means such that said riding platform means shifts between said first and second locations as said further wheel means are moved rearward and forward of said rear end of said frame, respectively.

3. The power lawn mower as in claim 1 and further including manually actuated latch means mounted on said frame for selectively locking said axis of rotation of said further wheel means in said forward and rearward positions relative to said rear end of said frame.

4. The power lawn mower as in claim 1 wherein said means for selectively coupling said engine output shaft in driving relation to said further wheel means includes:
   (a) a driven shaft journaled for rotation across the width dimension of said frame;
   (b) transmission means having an input shaft coupled to said output shaft of said engine and an output shaft coupled to said driven shaft; and
   (c) clutch means interposed between said driven shaft and said further wheel means for selectively clamping said further wheel means to said driven shaft.

5. The power lawn mower as in claim 4 and further including selectively actuatable braking means coupled to said further wheel means.

6. The power lawn mower as in claims 4 or 5 wherein said further wheel means comprises first and second wheels disposed on opposed ends of said driven shaft.

7. The power lawn mower as in claim 5 and further including:
   (a) handlebar means coupled to said frame;
   (b) a pair of clutch actuating levers mounted on said handlebar means;
   (c) a pair of brake actuating levers mounted on said handlebar means; and
   (d) means coupling said pair of clutch actuating levers and brake actuating levers to said clutch means and braking means.

8. The power lawn mower as in claim 4 wherein said transmission means includes forward and reverse gear positions.

* * * * *